(12) United States Patent
Nies et al.

(10) Patent No.: US 8,177,510 B2
(45) Date of Patent: May 15, 2012

(54) METHOD AND SYSTEM FOR BRAKING IN A WIND TURBINE

(75) Inventors: Jacob Johannes Nies, Zwolle (NL); Shanmuga-Priyan Subramanian, Rheine (DE); Mikael Lindberg, Karlstad (SE); Kristina Anne Cruden, Greenville, SC (US); Arthur Lawrence Romano, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/984,039

(22) Filed: Jan. 4, 2011

(65) Prior Publication Data
US 2011/0211961 A1 Sep. 1, 2011

(51) Int. Cl.
*F03D 7/00* (2006.01)
(52) U.S. Cl. .................................... 416/169 R
(58) Field of Classification Search .................. 415/123; 416/169 R
See application file for complete search history.

(56) References Cited

U.S. PATENT DOCUMENTS

| 7,762,771 B2 | 7/2010 | Nies | |
|---|---|---|---|
| 2007/0098549 A1 | 5/2007 | Nies | |
| 2009/0047129 A1* | 2/2009 | Yoshida | 416/9 |
| 2009/0184519 A1* | 7/2009 | Nies et al. | 290/44 |
| 2009/0208334 A1* | 8/2009 | Vettese et al. | 416/13 |
| 2010/0078939 A1 | 4/2010 | Kammer et al. | |
| 2010/0230966 A1* | 9/2010 | Pavlak | 290/44 |
| 2010/0314875 A1* | 12/2010 | Grant | 290/44 |

* cited by examiner

*Primary Examiner* — Edward Look
*Assistant Examiner* — Sean J Younger
(74) *Attorney, Agent, or Firm* — James W. Pemrick; Ernerst G. Cusick; Frank A. Landgraff

(57) ABSTRACT

A braking system for a wind turbine is provided. The system includes one or more motors for driving a part of the wind turbine, a first group of brakes for braking the part of the wind turbine, and a second group of brakes for braking the part of the wind turbine. The first group of brakes is in a normally closed condition and the second group of brakes is in a normally open condition, so that a default brake torque can be selectively chosen that is less than a maximum brake torque.

17 Claims, 5 Drawing Sheets

METHOD AND SYSTEM FOR BRAKING IN A WIND TURBINE

BACKGROUND OF THE INVENTION

The invention described herein relates generally to wind turbines. More specifically, the invention relates to a method and system for configuring the default states of brakes in a wind turbine.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 80 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is fed into a utility grid.

The design of the blades and the tower of a wind turbine are often dimensioned by the extreme loads that occur during storm winds combined with grid loss. Even though the turbine blades are fixed at an angle close to ninety (90) degrees, they are not really in a feathered position because the lack of grid power prevents the wind turbine from yawing towards or away from the wind direction. Extreme loads in the blades and tower are produced by the force of strong storm winds that hit a large surface area of the blade (lateral yaw direction) and nacelle. The storm loads may be alleviated by providing a source of secondary power, such as a diesel generator, in order to yaw the turbine towards or away from the incoming wind. For example, one such method keeps the plane of rotation of the rotor substantially perpendicular to the direction of wind. The blade angle of the rotor blades are adjusted to a minimum operating angle close to ninety (90) degrees for spinning the rotor and the generator to produce the necessary power to turn the rotor and to keep the rotor toward the incoming wind during storm loads. However, it is desirable to alleviate the need for a separate backup generator because of the extra cost and complexity associate therewith.

In addition, the yawing of the wind turbine to keep the rotor perpendicular to the wind direction may be prevented due to the lack of grid or back-up power. In some applications, it may be desirable to have the wind turbine go downwind in storm and grid loss. The lack of power can potentially prevent this. In addition, yawing of the turbine can only be done very slowly (about 0.5 degrees/s) due to load constraints on the turbine structure. Hence, if the wind direction changes rapidly, one will not be able to keep the rotor perpendicular to the wind direction and the strategy used in conventional wind turbines will not have the desired outcome. Many systems use a motor brake that has a brake torque demand during grid loss, and these brakes are typically provided with a normally-closed function. That is, when power loss occurs the brakes close and prevent movement of the relevant structures. These brakes exert the same brake torque during application in operation (e.g., at yaw runaway during a grid loss state). For turbines designed to go downwind during storms or grid loss events, this normally closed brake configuration may result in a brake torque that is too high.

BRIEF DESCRIPTION OF THE INVENTION

In an aspect of the present invention, a braking system is provided for a wind turbine. The system includes one or more motors for driving a part of the wind turbine, a first group of one or more brakes for braking the part of the wind turbine, and a second group of the one or more brakes for braking the part of the wind turbine. The first group of the one or more brakes is in a normally closed condition and the second group of the one or more brakes is in a normally open condition.

In another aspect of the present invention, a brake system is provided where an actuator in a wind turbine exerts an increasing braking torque as the actuator speed increases.

In yet another aspect of the present invention, a wind turbine is provided having a tower, a nacelle mounted on the tower, and a rotor having a hub and one or more rotor blades. The wind turbine also includes a brake system for controlling one or more brakes. The brake system includes one or more motors for driving a part of the wind turbine, a first group of brakes for braking the part of the wind turbine, and a second group of brakes for braking the part of the wind turbine. The first group of brakes is in a normally closed condition and the second group of brakes is in a normally open condition, so that a default brake torque can be selectively chosen that is less than a maximum brake torque.

BRIEF DESCRIPTION OF THE DRAWINGS

These and other features, aspects, and advantages of the present invention will become better understood when the following detailed description is read with reference to the accompanying drawings in which like characters represent like parts throughout the drawings.

DETAILED DESCRIPTION OF THE INVENTION

Figure 1:
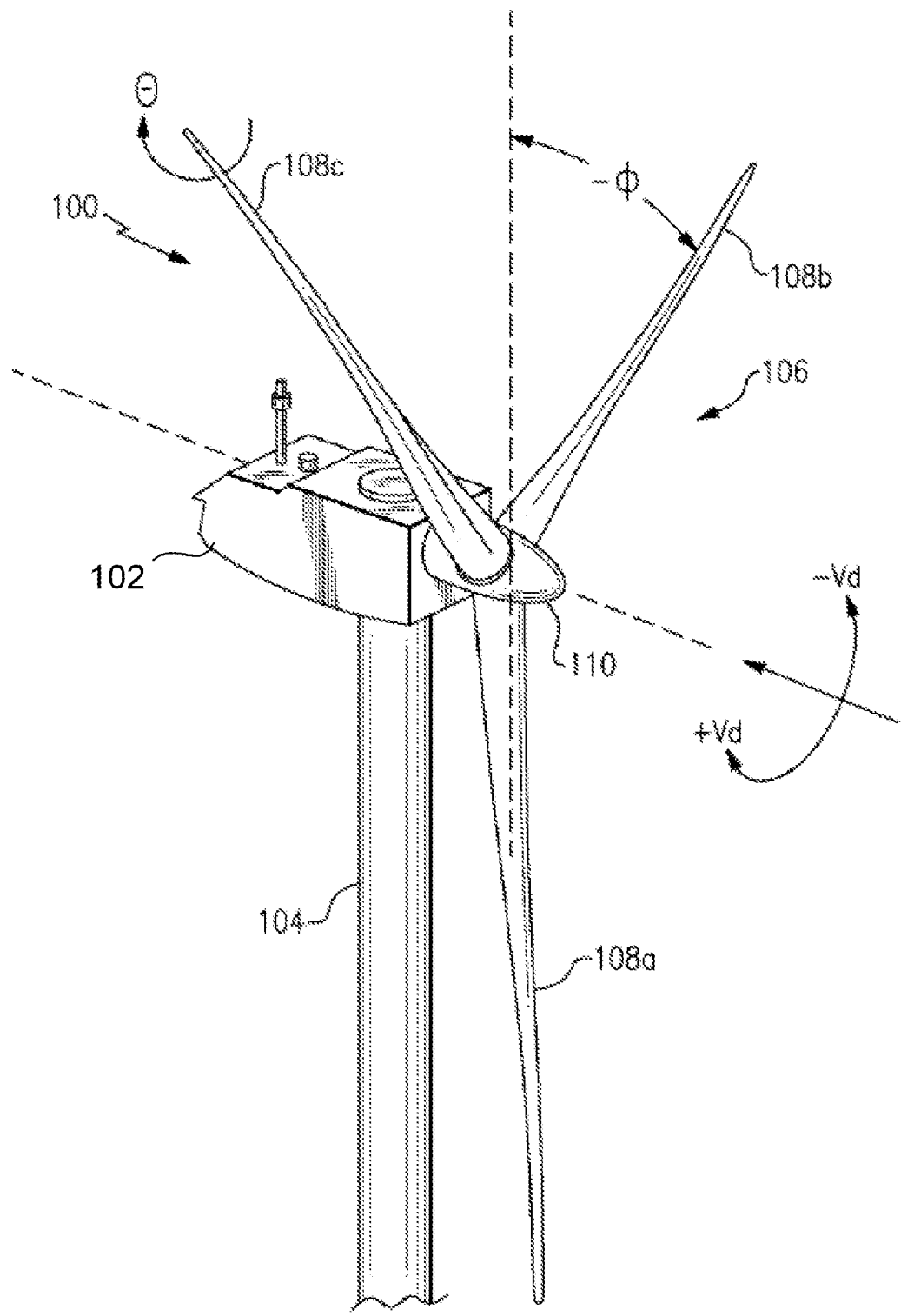
FIG. 1 is a perspective illustration of a portion of a wind turbine.

In the drawings identical reference numerals denote the same elements throughout the various views.

Referring now to FIG. 1, a wind turbine 100 in some configurations comprises a nacelle 102 mounted on top of a tall tower 104, only a portion of which is shown in FIG. 1. The wind turbine 100 also comprises a rotor 106 that includes one or more rotor blades 108a, 108b and 108c attached to a rotating hub 110. Although the wind turbine 100 illustrated in FIG. 1 includes three rotor blades, there are no specific limits on the number of rotor blades 108 required by the aspects of the present invention.

Figure 2:
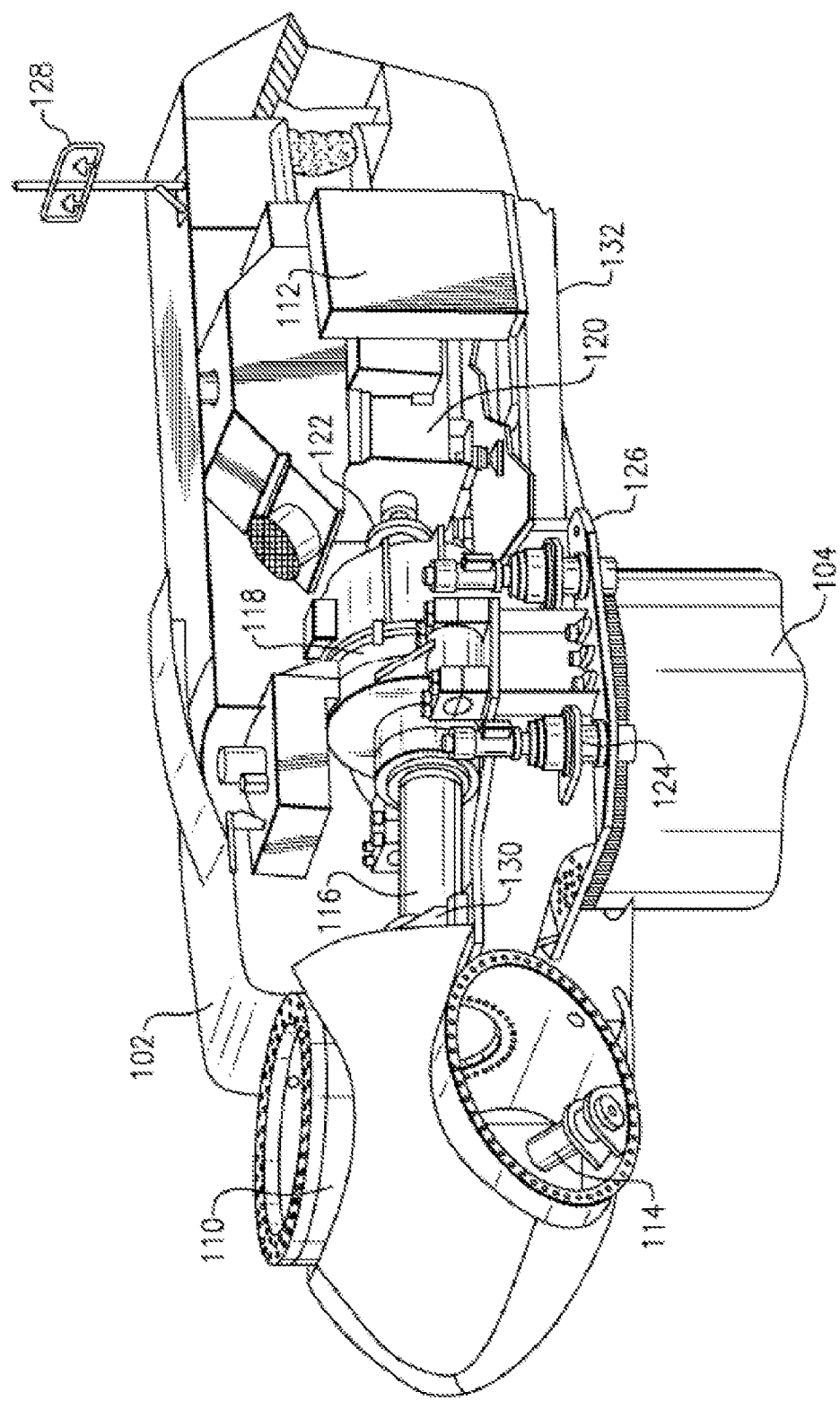
FIG. 2 is a cut-away perspective illustration of a nacelle that can be used with the wind turbine of FIG. 1.

Referring now to FIG. 2, various components are housed in the nacelle 102 atop the tower 104 of the wind turbine 100. The height of the tower 104 is selected based upon factors and conditions known in the art. In some configurations, one or more microcontrollers within the control panel 112 comprise a control system that is used for overall system monitoring and control including pitch and speed regulation, high-speed shaft and yaw brake application, yaw and pump motor application and fault monitoring. Alternative distributed or centralized control architectures are used in some configurations.

The control system provides control signals to a variable blade pitch drive 114 to control the pitch of blades 108 (not shown in FIG. 2) that drive the hub 110 as a result of wind. In the illustrated figure, the hub 110 receives three blades 108, but other configurations can utilize any number of blades. The pitches of the blades 108 are individually controlled by blade pitch drive 114. One pitch drive 114 is shown, but it is to be understood that one or more pitch drives could be used on each blade 108. The hub 110 and blades 108 together comprise wind turbine rotor 106.

In case of loss of grid power, it would be desirable to be able to control the pitch of blades 108 to assist with braking and regulation of rotor speed. Therefore, it may be desirable that an auxiliary power supply (not shown) is provided in or near the turbine 100 to provide emergency backup power for the variable blade pitch drive 114. Energy storage, for example battery packs (not shown) may be provided in the hub 110 to provide backup power to the variable blade pitch drive 114 for each of the blades 108.

The drive train of the wind turbine includes a main rotor shaft 116 (also referred to as a "low speed shaft") connected to the hub 110 and a gear box 118 that, in some configurations, utilizes a dual path geometry to drive a high-speed shaft enclosed within gear box 118. The high-speed shaft (not shown in FIG. 2) is used to drive a generator 120. In some configurations, rotor torque is transmitted by a coupling 122. The generator 120 may be of any suitable type, for example, a wound rotor induction generator. In some configurations, a gearbox is not used, and instead, the rotor shaft 116 directly drives the generator 120.

A yaw drive 124 and a yaw deck 126 provide a yaw orientation system for wind turbine 100. In some configurations, the yaw orientation system is electrically operated and controlled by the control system in accordance with information received from a wind vane 128. In some configurations, the yaw system is mounted on a flange provided atop tower 104. Only two yaw drives 124 are shown, but any number of suitable yaw drives can be used as desired in the specific application.

Figure 3:
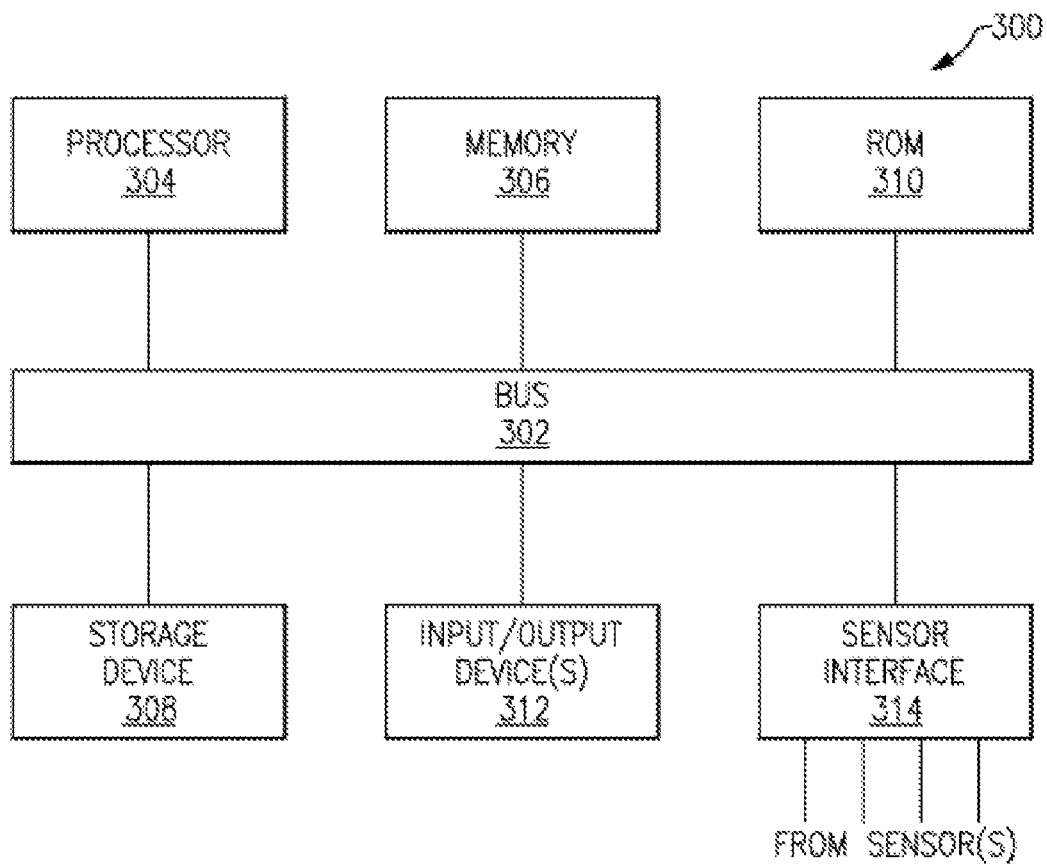
FIG. 3 is a block diagram of an exemplary configuration of a control system for the wind turbine of FIG. 1.

Referring now to FIG. 3, a control system 300 for the wind turbine 100 includes a bus 302 or other communications device to communicate information. Processor(s) 304 are coupled to the bus 302 to process information, including information from sensors configured to measure displacements or moments. The control system 300 further includes random access memory (RAM) 306 and/or other storage device(s) 308. The RAM 306 and storage device(s) 308 are coupled to the bus 302 to store and transfer information and instructions to be executed by processor(s) 304. RAM 306 (and also storage device(s) 308, if required) can also be used to store temporary variables or other intermediate information during execution of instructions by processor(s) 304. The control system 300 can also include read only memory (ROM) and or other static storage device 310, which is coupled to the bus 302 to store and provide static (i.e., non-changing) information and instructions to processor(s) 304. The input/output device(s) 312 can include any device known in the art to provide input data to the control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, and the like. In some embodiments, hard-wired circuitry can be used in place of or in combination with software instructions. Thus, execution of sequences of instructions is not limited to any specific combination of hardware circuitry and software instructions. The sensor interface 314 is an interface that allows the control system 300 to communicate with one or more sensors. The sensor interface 314 can be or can comprise, for example, one or more analog-to-digital converters that convert analog signals into digital signals that can be used by the processor(s) 304.

Wind turbines are often designed with multiple yaw drives, however, the brakes on these yaw drives have mostly been supplied with a normally-closed function. As mentioned previously, this normally-closed function on all the brakes can prevent the wind turbine from yawing downwind during storms or grid loss events.

Figure 4:
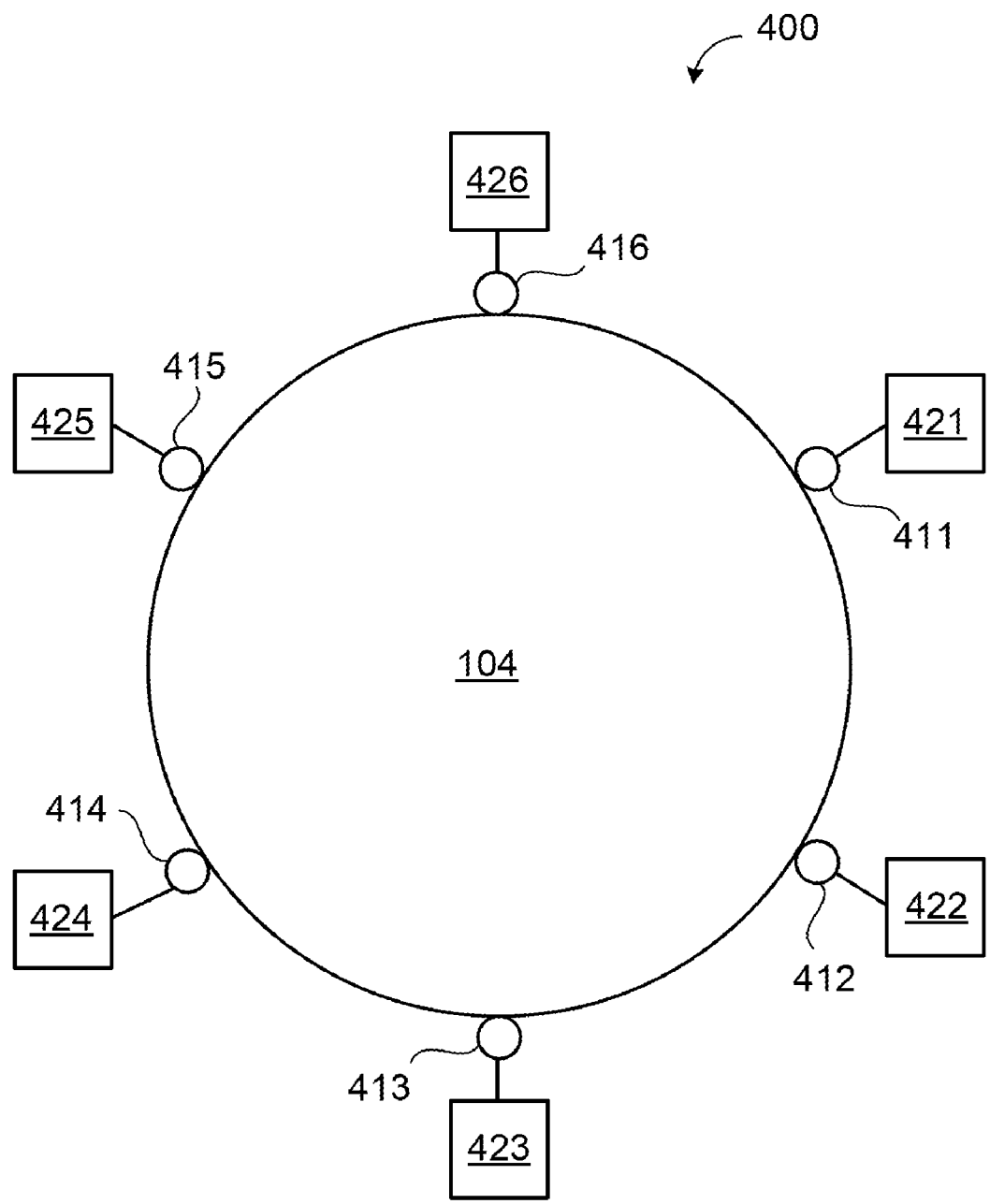
FIG. 4 is a simplified schematic illustration of a yaw drive system that can be used with the wind turbine of FIG. 1, according to an aspect of the present invention.

FIG. 4 illustrates a simplified schematic view of a yaw braking system 400 for a wind turbine according to an aspect of the present invention. Tower 104 interfaces with a plurality of yaw drives 411-416 with respective brakes 421-426. When more than one brake is applied, each brake 421-426 can be designed to have different default conditions. For example, one group of brakes (e.g., 421, 423 and 425) can be designed to have a normally-closed default state, while another group of brakes (e.g., 422, 424, and 426) can be designed to have a normally-open default state. This configuration allows the yaw braking torque to be chosen in a stepwise manner between the full braking torque (e.g., all brakes normally-closed) and a zero brake torque (e.g., all brakes normally-open). The advantage is that during storms or grid loss events, the wind turbine can be allowed to yaw downwind, which may be desired in some applications.

In the example above, the yaw brakes default torque value was decreased by 50%, compared to a system having all the yaw brakes defaulted in a normally-closed condition. This torque reduction allows the nacelle to "slip" or rotate downwind in storm conditions or during grid loss events. The braking system, according to aspects of the present invention, allows the default brake torque to be controlled and selectively chosen so that it may have a value which is less than a maximum brake torque.

As is known in the art, a disc brake exerts high torque at standstill and a lower torque as the speed increases. In another example, one or more of the brakes may exert a braking torque that is dependent on a variable in the braking system. As yet another example, the brake may be configured to have a centrifugal brake that exerts no torque at low yaw speeds and makes the braking torque increase as the yaw speed increases. In yet another example the brake may be connected by a coupling of the centrifugal type, which combination exerts torque as a direct function of the yaw speed, limited to the capacity of the brake. By any of these examples, the turbine rotor is allowed to remain downwind following the wind direction while preventing the yaw speed to become as high as when it would damage the equipment.

Wind turbines typically have multiple yaw drives with respective brakes. Any number of brakes can be configured in the normally-closed and normally-open state to obtain a specific braking torque during storm conditions or during grid loss events. Referring back to FIG. 4, the brakes can be configured and controlled to have one brake configured as normally-closed and five brakes configured as normally-open, or two brakes configured as normally-closed and four brakes configured as normally-open, or three brakes configured as normally-closed and three brakes configured as normally-open, or four brakes configured as normally-closed and two brakes configured as normally-open, or five brakes configured as normally-closed and one brake configured as normally-open. This lists some of the possible configurations with a yaw system having six yaw drives/brakes, however, it is to be understood that the present invention can be scaled to and used with a system having any number of yaw drives/brakes.

Figure 5:
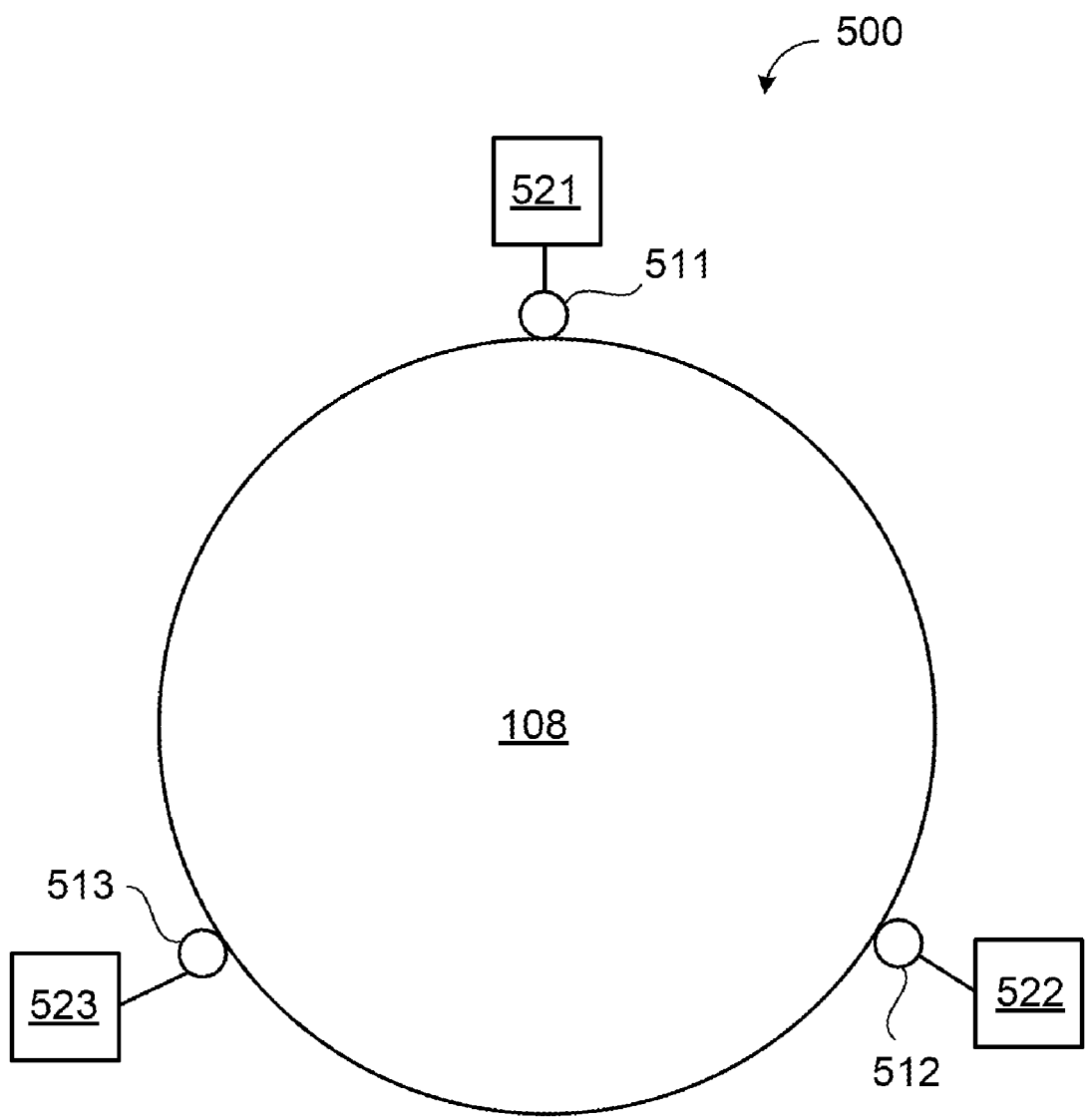
FIG. 5 is a simplified schematic illustration of a pitch drive system that can be used with the wind turbine of FIG. 1, according to an aspect of the present invention.

The system could also be used in a pitch mechanism in a rotor blade. FIG. 5 illustrates a simplified schematic view of a pitch braking system 500 for a rotor blade 108 in a wind turbine according to an aspect of the present invention. Rotor blade 108 includes a plurality of pitch drives 511, 512, 513 with respective brakes 521, 522, 523. When more than one brake is applied, each brake 521, 522, 523 can be designed to have different default conditions. For example, one group of brakes (e.g., 521, 522) can be designed to have a normally-closed default state, while another group of brakes (e.g., 523) can be designed to have a normally-open default state. As another example, one group of brakes (e.g., 521) can be designed to have a normally-closed default state, while another group of brakes (e.g., 522, 523) can be designed to have a normally-open default state. This configuration allows the pitch motor braking torque to be chosen in a stepwise manner between the full braking torque (e.g., all brakes normally-closed) and a zero brake torque (e.g., all brakes normally-open). The advantage is that during storms or grid loss events, the rotor blades can be allowed to rotate into a feathered or "idled" state, which may be desired in some applications.

The yaw motors or pitch motors can have any suitable brake system. For example, the aspects of the present invention can be applied to disc brakes used with electric motors, electric motors having a normally closed or open short circuit to create a braking torque during rotation, an electric motor having a mechanical or electrical brake, and hydraulic drives with several braking behaviors, e.g. created by several levels of overpressure valves and restrictions in the overflow line.

The default brake state is mostly a designed or configured state. However, according to an aspect of the present invention, it is possible to create latching functions that change the default state as desired as long as there is grid or back-up power. This functionality can enhance reliability and can help to ensure that the desired level of brake torque is applied on the actuator. A brake system, according to an aspect of the present invention, can include an actuator that exerts an increasing braking torque as the actuator speed increases. In addition, if one or more of the brakes has a malfunction or fails, then another brake or brakes may be given the function of the brake(s) with the problem(s). Equally so, if a latch does not function the way it is intended, the control system can change the default state of the failed latch and the remaining ones accordingly. One example is given in Table 1, and this illustrates one possible configuration of six yaw drives with half of the brakes normally closed.

As one example only, if yaw drive #1 malfunctioned, then yaw drive #2 could be configured to brake during grid loss. The level of available braking torque can be configured depending on the type of motor drives and brake contractors. Also, instead of digitally applied brakes having only zero or full brake torque, the system could be configured with analog, multi-position or multi-torque controlled brakes. Each brake could have various levels of brake torque between a level of zero and full brake torque. As one non-limiting example only, each brake could have a configurable torque level of 0%, 20%, 40%, 60%, 80% and 100%, or any other suitable interval of available brake torques.

The wind turbine may be equipped with a monitor system that monitors the state and function of the latches and brakes. This monitoring can take place as continuous measurement of the state, the measuring of effectiveness or state of the brake during normal operation including the thickness of the brake pads as well as monitoring of the state and function of the brake during test cycles.

It is to be understood that all aspects of this invention can be applied to either or both of the pitch or yaw drives/brakes in the wind turbine. In addition, the present invention could also be applied to any other wind turbine system that needs a braking system. It is also to be understood that the magnitude of the braking capacity of any brake mentioned in this invention may not be equal to the torque generated by the driving motor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A braking system in a wind turbine, the braking system comprising:
   one or more motors for driving a part of the wind turbine;
   a first group of one or more brakes for braking the part of the wind turbine, each brake in the first group of one or more brakes having a normally-closed default state;
   a second group of one or more brakes for braking the part of the wind turbine, each brake in the second group of one or more brakes having a normally-open default state;

TABLE 1

| | | | Grid Available | | |
| | Yaw Position OK | | Yaw Position NOK | | |
| Yaw Drive | Active System | Passive System | Sign $(n_{yaw, actual})$ = Sign $(n_{yaw, set})$ | Sign $(n_{yaw, actual})$ ≠ Sign $(n_{yaw, set})$ | Grid Loss |
|---|---|---|---|---|---|
| #1 | Open | Brake | Open | Brake | Brake |
| #2 | | | | | Open |
| #3 | | | | | Brake |
| #4 | | | | | Open |
| #5 | | | | | Brake |
| #6 | | | | | Open | wherein the first group of one or more brakes is in a normally closed condition and the second group of one or more brakes is in a normally open condition, so that a default brake torque can be selectively chosen that is less than a maximum brake torque.

2. The braking system of claim 1, wherein the one or more motors comprise a pitch drive.

3. The braking system of claim 2, wherein the part of the wind turbine is a rotor blade.

4. The braking system of claim 1, wherein one or more motors comprise a yaw drive.

5. The braking system of claim 4, wherein the part of the wind turbine is a nacelle.

6. The braking system of claim 1, wherein during a grid loss event the first group of one or more brakes is in a normally closed condition and the second group of one or more brakes is in a normally open condition.

7. The braking system of claim 6, wherein during a grid available condition the first group of one or more brakes and the second group of one or more brakes are in a like condition.

8. The braking system of claim 1, wherein an actuator in the wind turbine exerts an increasing torque as the actuator speed increases.

9. The braking system of claim 8, wherein a pitch drive comprises the actuator, and the pitch drive is capable of rotating a rotor blade relative to a hub.

10. The braking system of claim 8, wherein a yaw drive comprises the actuator, and the yaw drive is capable of rotating a nacelle of the wind turbine relative to a tower of the wind turbine.

11. A wind turbine comprising:
a tower;
a nacelle mounted on the tower;
a rotor having a hub and one or more rotor blades;
a brake system for controlling one or more brakes, the system comprising:
one or more motors for driving a part of the wind turbine;
a first group of the one or more brakes for braking the part of the wind turbine, each brake in the first group of one or more brakes having a normally-closed default state;
a second group of the one or more brakes for braking the part of the wind turbine, each brake in the second group of one or more brakes having a normally-open default state;
wherein the first group of the one or more brakes is in a normally closed condition and the second group of the one or more brakes is in a normally open condition, so that a default brake torque can be selectively chosen that is less than a maximum brake torque.

12. The wind turbine of claim 11, wherein the one or more motors comprise at least one of a pitch drive, and a yaw drive.

13. The wind turbine of claim 12, wherein the part of the wind turbine is at least one of the one or more rotor blades, and the nacelle.

14. The wind turbine of claim 11, wherein during a grid loss event the first group of the one or more brakes is in a normally closed condition and the second group of the one or more brakes is in a normally open condition; and
wherein during a grid available condition the first group of the one or more brakes and the second group of the one or more brakes are in a like condition.

15. The wind turbine of claim 11, wherein an actuator in the wind turbine exerts an increasing torque as the actuator speed increases.

16. The wind turbine of claim 15, wherein a pitch drive comprises the actuator, and the pitch drive is capable of rotating a rotor blade relative to a hub.

17. The wind turbine of claim 15, wherein a yaw drive comprises the actuator, and the yaw drive is capable of rotating a nacelle of the wind turbine relative to a tower of the wind turbine.

\* \* \* \* \*